United States Patent [19]

Curiel

[11] Patent Number: 5,024,904
[45] Date of Patent: Jun. 18, 1991

[54] DIRECT CURRENT SALT WATER ACTIVATED GENERATOR

[75] Inventor: Ray Curiel, Scottsdale, Ariz.

[73] Assignee: Envirolite Products, Inc., Vancouver, Canada

[21] Appl. No.: 607,514

[22] Filed: Nov. 1, 1990

[51] Int. Cl.$^5$ .......................................... H01M 12/04
[52] U.S. Cl. ..................................... 429/27; 429/118; 429/187; 429/113
[58] Field of Search ............... 429/118, 119, 113, 110, 429/27, 187, 176

[56] References Cited

U.S. PATENT DOCUMENTS

| | | | |
|---|---|---|---|
| 3,832,237 | 8/1974 | Kinsey | 429/49 |
| 3,953,238 | 4/1976 | Honer | 429/119 |
| 4,745,529 | 5/1988 | Hamlen et al. | 429/118 X |
| 4,822,698 | 4/1989 | Jackowitz et al. | 429/27 |

*Primary Examiner*—Anthony Skapars
*Attorney, Agent, or Firm*—LaValle D. Ptak

[57] ABSTRACT

A portable, direct current electric generator uses a salt water solution as an electrolyte. An outer housing in the form of an open-topped, rectangular box is provided, and an inner housing having a compartment for receiving the salt water electrolyte is placed within the outer housing. A space is provided between at least one of the walls of the inner housing and a wall of the outer housing, and provision is made to supply air to this space. The inner housing member has an aperture in the side facing the air space, and an air cathode member is secured in this aperture. The air cathode member is air-permeable, but is impervious to water on the side facing the air space. A metal anode, preferably made of magnesuim, aluminum, or a magnesium-aluminum alloy, is removably secured to a removable cover placed over the open top of the inner and outer housing members to extend into the salt water solution within the inner housing member. Electrical connections are provided for connecting a load between the cathode and the anode. When the anode is consumed, it is removed from the cover and replaced with a new anode.

34 Claims, 2 Drawing Sheets

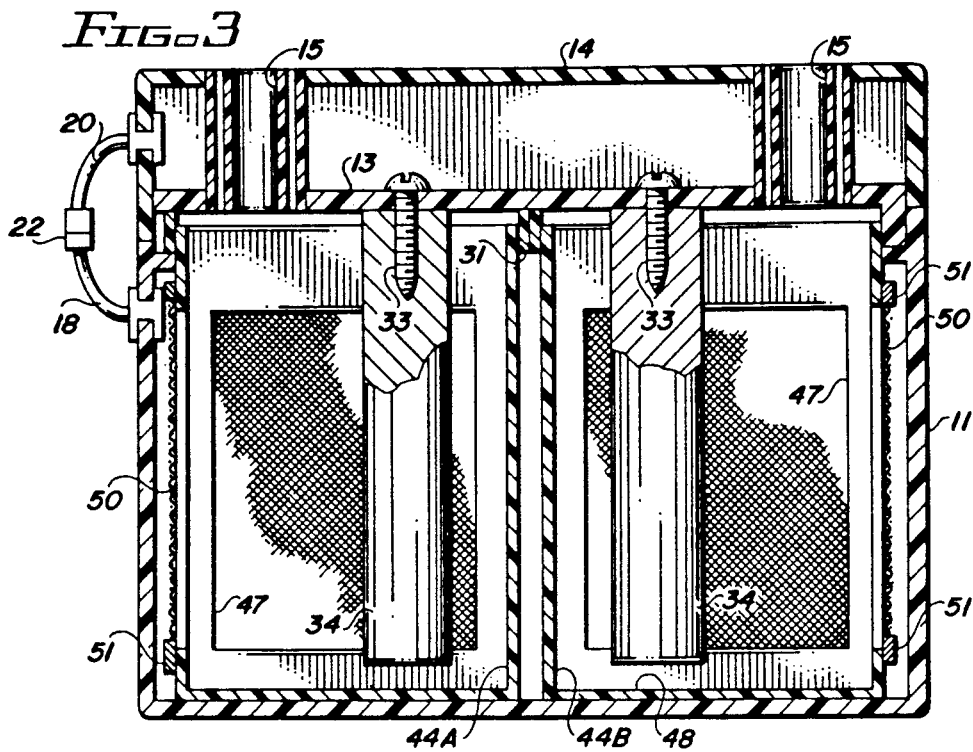
FIG. 3
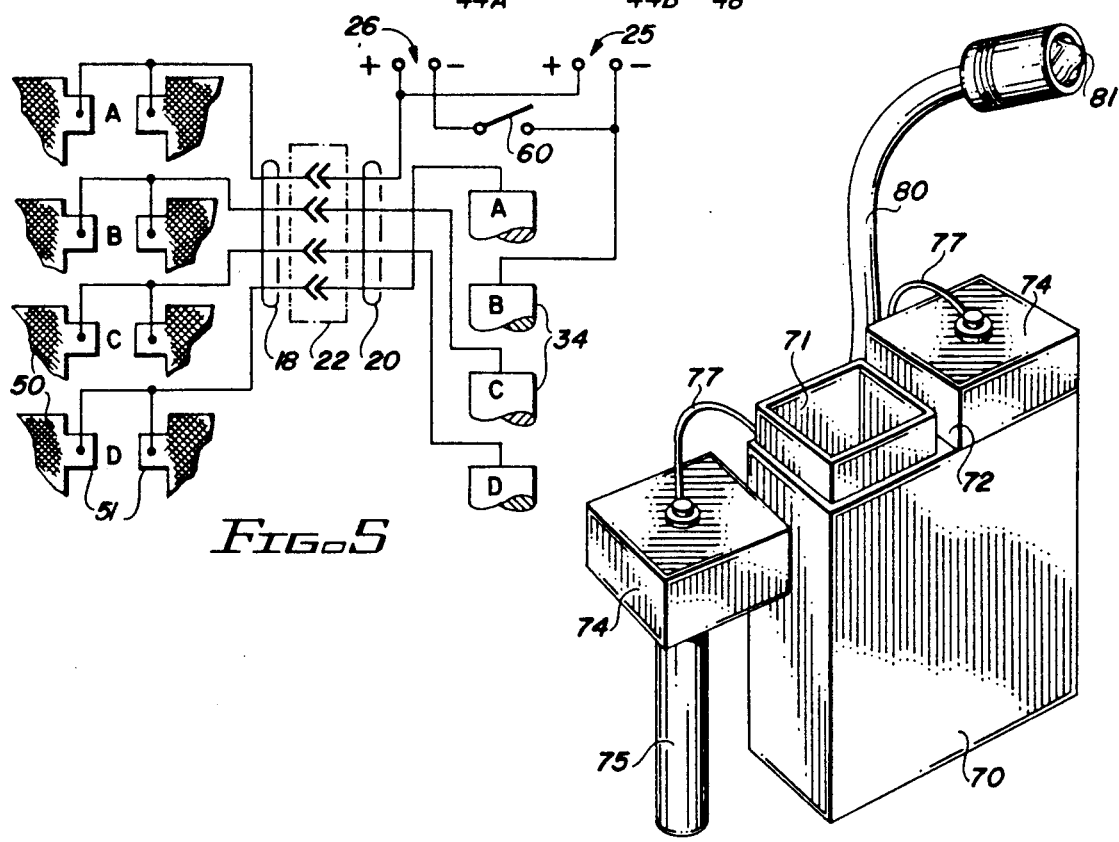
FIG. 5
FIG. 6

5,024,904

DIRECT CURRENT SALT WATER ACTIVATED GENERATOR

BACKGROUND OF THE INVENTION

Portable, battery operated electrical devices are in widespread use. Typically, such devices include flashlights, lanterns, and small electric motors such as used for electric razors and small personal fans. These devices generally are powered by one or the other of two types of dry-cell batteries, namely, disposable batteries or rechargeable batteries. The life of such batteries is relatively limited before they must be replaced or recharged. In addition, dry cell batteries are relatively heavy for their size, and they present an environmental hazard when they are discarded.

Solar cell devices exist for converting sunlight or other light energy into electricity for powering a variety of different devices. Hand-held solar cell generator devices are used, for example, for powering small pocket-sized electronic calculators and other similar devices. The problem with solar cell devices, however, is that they require sunlight or other relatively strong light to function. Such devices, consequently, are not of value at night, or in darkened rooms.

Devices have been developed for thermo-electrically generating power to operate wristwatches. The heat for operating the thermoelectric generator for such watches is obtained from the wrist of the wearer. Four patents disclosing devices of this type are the patents to Pack U.S. Pat. No. 3,018,430; Compte U.S. Pat. No. 4,165,477; Dolezal U.S. Pat. No. 4,212,292; and Baumgartner U.S. Pat. No. 4,320,477. Sufficient power is generated by the thermo-electric generators of these watches to continuously operate the watches, so long as they are worn on the wrist. Consequently, it is not necessary to replace batteries in these devices.

Small non-battery portable electric generators for personal use, employing other techniques have been developed. For example, the device shown in the patent to Horrell U.S. Pat. No. 2,463,538 is a small hand-held electromagnetic generator in which a wheel is rotated by means of air pressure generated from a flexible rubber squeeze bulb. The limitations of this device are readily apparent, since the bulb must be squeezed continuously to produce the air supply for driving the generator.

A different approach to an electrical generator of a non-conventional type also is disclosed in the patent to Hayes U.S. Pat. No. 4,409,489. This patent discloses a network of collapsible tubes placed over a roadway or other area traversed by motor vehicles. Working fluid is placed in the tubes, which are attached to a turbine generating system. Vehicles moving over the tubes cause the generation of electricity. Obviously, when the vehicles are not present, the electricity generation terminates.

Another small, air-driven turbine generator is disclosed in the patent to May U.S. Pat. No. 4,511,806. This turbine is placed in the fluid line for an underwater breathing system, to be driven by the fluid coming from the oxygen tanks before it is delivered to the breathing apparatus of the diver. Consequently, electricity for use by the diver is provided, so long as air is supplied from the oxygen tanks. Salt water activated generators, employing metallic anodes and compatible cathodes also have been developed. Typically, a salt water or brine solution is placed in a tank which also contains an anode and a cathode, connected to the electrical load to be energized. So long as the salt water solution is maintained and until the anode is consumed, these devices produce usable amounts of electricity. Typically, however, devices of this type are not small, hand-held devices, and they have limited life, determined by the rate of depletion of the anode and/or cathode materials used in them.

Accordingly, it is an object of this invention to provide an improved small, portable electrical generator which is inexpensive, uses no volatile fuels, is operated from readily available materials, and which utilizes replaceable components for extended life of the device.

SUMMARY OF THE INVENTION

Accordingly, it is an object of this invention to provide an improved direct current electrical generator.

It is another object of this invention to provide an improved electrical generator utilizing a salt water electrolyte.

It is an additional object of this invention to provide an improved hand-held electrical generator, using a salt water electrolyte and readily replaceable anodes.

In accordance with a preferred embodiment of the invention, a portable, direct current electric generator includes an open-topped plastic housing for holding an electrolyte. The housing has at least one side exposed to air, with an aperture in it. An air cathode is secured in the aperture and has a membrane on the side exposed to the air which is permeable to air but impermeable to water. A removable cap is provided for substantially closing the top of the housing. An anode extends into the housing interior, and when a salt water solution is placed in the housing interior, an electrolytic reaction occurs to produce direct current electric power supplied to a load connected between the anode and cathode. When the anode becomes depleted, it readily may be removed from the cap and replaced with a new anode. The device is constructed so that the air cathode is protected against outside contact.

BRIEF DESCRIPTION OF THE DRAWING

FIG. 3 is diagrammatic cross-sectional representation of the relative component arrangements of the device of FIG. 2 in its assembled state;

FIG. 5 is a schematic diagram of the wiring interconnections of the embodiment shown in FIGS. 1 through 4; and FIG. 6 is a perspective view of an alternative embodiment of the invention.

DETAILED DESCRIPTION

Figures 1, 2, 4:
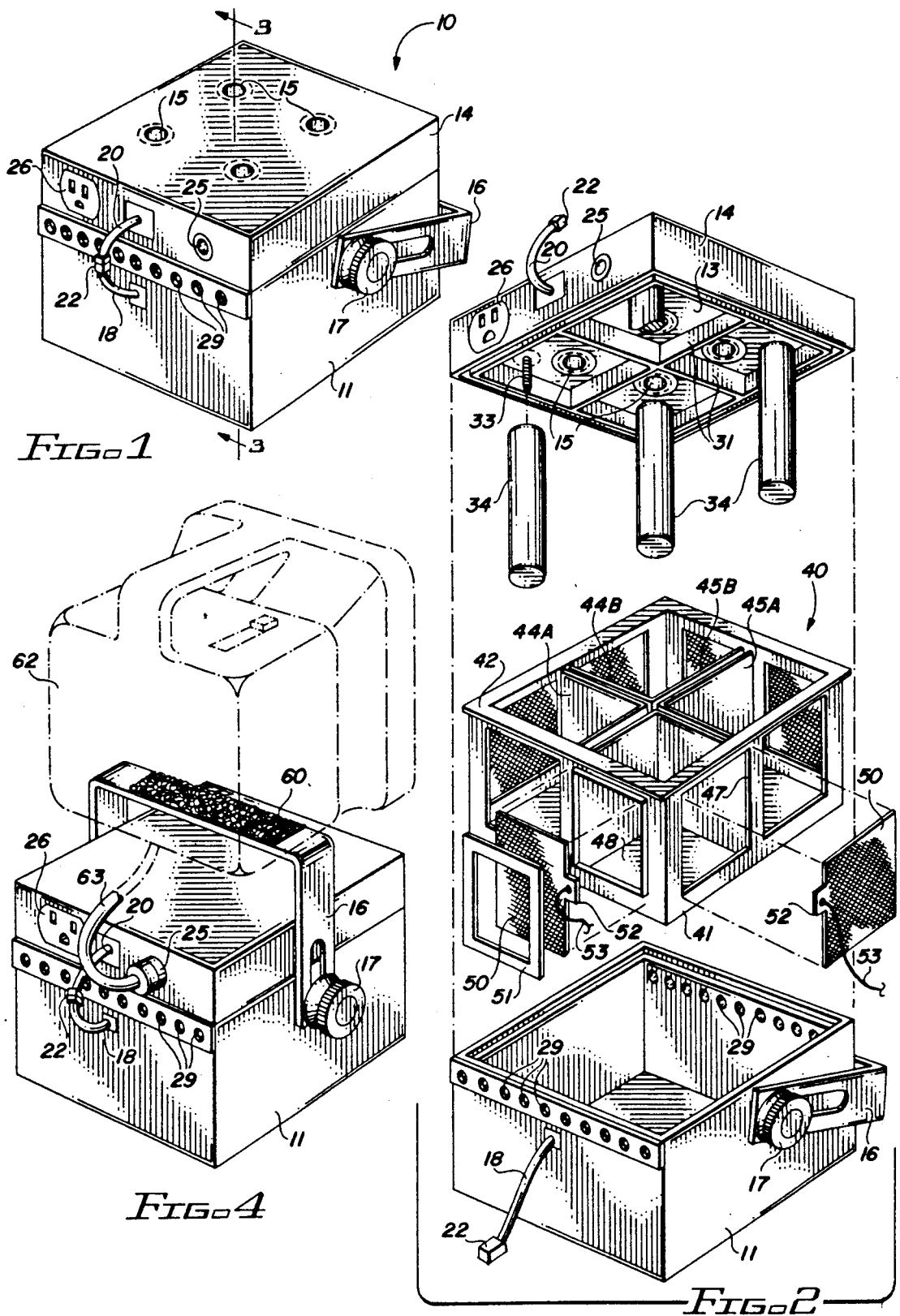
FIG. 1 is a perspective view of a preferred embodiment of the invention.
FIG. 2 is an exploded perspective view of the preferred embodiment shown in FIG. 1, illustrating details of the structure.
FIG. 4 is a perspective view illustrating a use of the device of FIGS. 1 through 3.

Reference now should be made to the drawings in which the same reference numbers are used throughout the different figures to designate the same components. Referring now to FIG. 1, there is shown a multiple cell portable electric generator 10, which includes an outer lower, rectangular housing member 11 having four upright sides and a bottom. Typically, this housing member 11 is formed of high-impact, lightweight plastic, although other materials can be used if desired. A removable cover 14 fits over the top of the housing, and the cover 14 has four air vents 15 through it to communicate with the interior of the lower housing 11. A handle 16 is secured to opposite sides of the lower housing 11 by means of adjustable pivots 17; so that it can be moved from the position shown in FIG. 1 to the position shown in FIG. 4, and secured in either position, as desired.

A multiple wire electrical cable 18 extends from a grommet in one of the walls of the lower housing 11 to terminate in one-half of a two-piece connector 22. Similarly a corresponding multiple wire cable 20 extends from a grommet in the side of the cover 14 to terminate in the other half of the two-piece connector 22 to complete an electrical interconnection between wires in the cable 18 and wires in the cable 20. When the connector 22 is pulled apart, the cover 14 may be completely removed from the lower housing 11, as illustrated most clearly in FIG. 2.

Electrical outlets 25 and 26, of conventional suitable types, are provided in the cover 14, which includes necessary electrical interconnections between the wires in the cable 20 and the outlets 25 and 26, to effect operating electrical contact with a suitable appliance or lamp, as desired. The housing 11 further includes a horizontal row of apertures 29 on opposite side walls to permit air to enter the housing 11 from outside the housing when the cover 14 is in place.

FIGS. 2 and 3 illustrate the details of the structure of the preferred embodiment of FIG. 1. As illustrated in FIG. 2, an inner housing member in the form of a four-compartment open-topped frame 40 is inserted into the lower outer housing member 11. A flange 42 on the top of the member 40 fits inside a corresponding groove around the edge of the top of the lower housing member to space each of the outer walls of the inner housing from the interior walls of the outer housing member. This provides an air space between the inner and outer housings to permit air passing through the apertures 29 to freely circulate on all four sides of the inner housing member 40. The member 40 preferably is removably attached in the housing 11, but a permanent attachment may be desired for some applications.

As is most readily apparent from an examination of FIG. 2, the inner housing member 40 includes four separate rectangularly shaped compartments formed by spaced, crossing, interior side walls 44A/44B and 45A/45B, which are secured to the bottom housing 40 and to each other to produce four watertight, isolated compartments within the inner housing.

Each of the four compartments of the inner housing, however, has a large rectangular aperture 47 formed on the two sides of each compartment which face the inside walls of the lower outer housing 11. Into each of these apertures in the outer walls 41, an air cathode 50 is placed to fit against a ridge formed around each of the openings 47. The air cathodes 50 are secured in place by means of an outer frame 51 which is pressed over each of the cathodes 50 in each of the apertures 47. The frame 51 is secured to the sides 41 around the apertures 47 by means of a silicon sealant or other suitable watertight adhesive. As is apparent in FIG. 2, each of the air cathodes 50 has a tab 52 on it to which is connected an electric wire 53. The tab 52 extends past the frame 51 into the air space. The wires 53 for each of the two air cathodes 50 for each of the four different compartments in the inner housing member 40 are connected together in common; so that four wires then are connected through the cable 18 to terminate in the connector 22 extending out of the housing 11, shown in the lower part of FIG. 2.

The air cathodes are of conventional commercial construction, and, typically, comprise a laminate of battery carbon material secured to a collector of expanded metal mesh (preferably nickel or steel) covered with a polyolefin film such as Teflon ®. Some air cathodes include carbon layers on both sides of the expanded metal mesh, with a polyolefin film placed over one of the carbon layers. The film side of the cathode 50 is placed on the outside in communication with the air space between the inner housing 40 and the outer housing 11. This film or other suitable material is impervious to water, but is permeable by air. Thus, air can pass from the air space between the inner and outer housings 40 and 11 through the film of the air cathode 50 and into the interior of each of the four compartments, which are filled with a salt water solution, as described subsequently.

The completion of the generator is established by providing screws 33 extending through a bottom 13 spaced from the top of the cover 14, as shown most clearly in FIG. 3. These screws have elongated cylindrical metal anode rods 34 threaded onto them for extension downwardly into the four different compartments formed in the inner housing 40, as shown in FIG. 2. The cover 14 also has a pair of crossing dividers 31 which extend downwardly into the grooves or spaces between the wall members 44A/44B and 45A/45B to separately close the watertight inner compartments of the housing 40 when the cover 14 is lowered into place to the position shown in FIGS. 1, 3 and 4.

It is readily apparent from an examination of FIG. 2 that whenever replacement of one of the cylindrical anodes 34 is desired, it simply is unscrewed from the screw 33 and a new anode rod 34 may be screwed in place. In a preferred embodiment of the invention, the anode rods are made of magnesium, aluminum or a magnesium/aluminum alloy.

To operate the device, a salt water or saline electrolyte solution is poured into each of the four compartments formed in the inner housing 40 when the lid 14 is removed to the position shown in FIG. 2. The salt water solution generally is a solution including 12% to 20% by weight of a suitable salt, such as sodium chloride. Once the salt water solution has been placed in each of the four compartments, the cover 14 is lowered into place to extend the anode rods 34 into the solution.

The electrical interconnections between the four different anode rods 34A, 34B, 34C, and 34D with corresponding pairs of air cathodes 50A through 50D are shown in FIG. 5. FIG. 5 indicates the interconnections made between the various anodes 34 and cathodes 50 through the cables 18 and 20 and the connector 22. As illustrated in FIG. 5, all of the four different cells or compartments of the generator are connected together in series to provide power to the outlet terminals 25 and 26. The specific physical interconnections of the wires illustrated in FIG. 5 have not been shown in the drawings of FIGS. 2 and 3, to avoid unnecessary cluttering of these drawings. It is understood, however, that these interconnections readily may be affected; and the necessary attachment of the wires to interconnect the outlets 25 and 26 with the wires from the cable 20 and the anodes 34 within the cover 14 may be made by way of a printed circuit board or by direct wiring, as desired.

When the anodes 34 are inserted into the salt water solution, an electrolytic reaction takes place to produce magnesium hydroxide (if a magnesium electrode is used) or aluminum hydroxide (if an aluminum anode is used) and an excess of electrons at the anodes 34. The oxygen from the air reacts with the water to produce hydroxyl ions (OH$^-$) and a depletion of electrons at the cathode. The utilization of the air cathodes supplies the additional oxygen required to optimize the production of hydroxyl ions in the water; so that the anode reaction produces excess electrons at a reasonable rate. Whenever an external load is connected to the terminals 25 or 26, the chemical reaction continues to produce an unbalance of electrons which flow through the circuit until all of the anode 34 is used up. When this occurs, the anodes 34 may be removed and replaced with new ones in the manner described above.

The inherent characteristics of the device constructed as described above produce power at 1½ volts per compartment. Thus, when the anodes 34 and cathodes 50 are connected in series as shown in FIG. 5, the output of the unit 10 is six (6) volts. The current density of the cathodes 50 is 20 milliamps per square centimeter.

FIG. 4 illustrates a lamp 62 which may be connected by means of a cable 63 to the outlet 25 to receive power from the generator shown in FIG. 1. Typically, a hook and loop fastener such as Velcro ® 60 is secured to the top of the handle 16 with a corresponding strip of the mating Velcro material secured to the bottom of the lamp 62. Consequently, the lamp 62 is secured to the handle 16 and may be left in this position, or the lamp may be picked up by its handle and moved about within the limits of the length of the cable 63. FIG. 4 serves as an illustration of a possible use of the direct current electrical generator of FIGS. 1 through 3, and other used with different types of appliances or electrical loads may also be used.

FIG. 6 illustrates a two-cell (three volt) alternative embodiment to the embodiment shown in FIG. 1. In FIG. 6, two identical watertight cells 71 are provided in a side-by-side relationship, with an air space 72 between them. The two sides of the cells which face one another have apertures (not shown) formed in them which are similar to the apertures 47 described in conjunction with the embodiment of FIGS. 1 through 4. These apertures have air cathodes 50 placed in them, and the air cathodes 50 are connected in series circuit with anodes 75 secured to caps 74 in the same manner as the anodes 34 are secured to the caps 14 in the embodiment of FIGS. 1 through 3. The caps 74 fit down over the tops of the cells 71, and circuit interconnections comparable to those of FIG. 5 are used to connect the two cells together in series. The output for the device of FIG. 6 is connected through a relatively stiff bendable cable 80 to terminate in a bulb 81. Consequently, the device forms a small, lightweight, portable flashlight, which is operated from a salt water electrolyte in the same manner as the embodiment in FIGS. 1 through 3.

The spacing 72 between the housings 71 of the embodiment of FIG. 6 may be maintained by securing them together on the sides which do not have an aperture to an outer housing 70, or securing them to a flat plate on one side and them putting a cosmetic cover 70 around them, as desired. The operation of the device of FIG. 6, however, is identical to that of the embodiment of FIGS. 1 through 4.

The dimensions of the unit 10 in a commercial embodiment are 4¾ inches high and 5¼ inches square. The unit of FIG. 6 in a commercial embodiment is 3 inches high, 2½ inches wide, and 1¼ inches deep.

The above description of the preferred embodiments, taken in conjunction with the drawings, is to be considered illustrative of the invention and not as limiting. For example, the anodes can be removably attached to the bottoms of the compartments instead of to the cap. Various changes and modifications will occur to those skilled in the art without departing from the true scope of the invention as defined in the appended claims.

I claim:

1. A portable direct current electric generator including in combination:

a lower outer housing member having enclosed sides, with an open top;

an inner housing member located within said lower outer housing member, said inner housing member having a bottom and closed sides and an open top, with at least a portion of a side of said inner housing member spaced from a side of said lower housing member to provide an air space adjacent said portion, and an aperture in said portion of said side of said inner housing member;

an air cathode member secured in said aperture in said portion of said side of said inner housing member, said air cathode member constructed to be impervious to water and permeable to air on the side thereof in contact with said air space, said inner housing member capable of holding water solutions with said air cathode member secured in said place in said aperture;

means for supplying air to said air space between said portion of said side of said inner housing member and said lower housing member;

cover means for removably covering the tops of said lower outer housing member and said inner housing member;

removable means extending into the interior of said inner housing member; and means for interconnecting an electrical load between said air cathode member and said anode means.

2. The combination according to claim 1 wherein said inner housing member is secured to said lower outer housing member.

3. The combination according to claim 2 wherein said inner housing member is removably secured to said lower outer housing member.

4. The combination according to claim 3 wherein said anode means comprises an elongated metallic rod secured by a threaded fastener to the underside of said cover means.

5. The combination according to claim 4 wherein said air cathode member comprises a laminate of carbon, expanded metal mesh, and an air-permeable film, with the film on the side of said cathode member, facing said air space.

6. The combination according to claim 5 wherein said cover means further includes air vents therein communicating with the open top of said inner housing member when said cover means covers the tops of said lower outer housing member and said inner housing member.

7. The combination according to claim 6 wherein said lower outer housing member has four vertically arranged rectangular sides, interconnected at the edges to form an open topped box; and said inner housing member includes at least four vertically oriented, rectangular sides forming an open topped box, and located within said lower outer housing member, with each side thereof spaced from the sides of said lower outer housing member to form said air space.

8. The combination according to claim 7 wherein said anode means comprises an elongated metallic rod selected from the class of aluminum, magnesium and magnesium-aluminum alloys.

9. The combination according to claim 8 further including a frame member for securing said air cathode member in said aperture in said inner housing member.

10. The combination according to claim 9 wherein said inner housing member comprises a plurality of separate sealed compartments for holding water solution therein, each of said sealed compartments having at least one side with an aperture therethrough communicating with said air space between said inner housing member and said outer housing member, with an air cathode member secured in each of said apertures, said air cathode members each constructed to be air-permeable; and said anode means comprises a plurality of anode means, each removably secured to the underside of said cover member, and each extending into a different one of said compartments in said inner housing member.

11. The combination according to claim 10 wherein said inner housing member is adapted to be filled with a salt water solution.

12. The combination according to claim 1 wherein said inner housing member comprises a plurality of separate sealed compartments for holding water solution therein, each of said sealed compartments having at least one side with an aperture therethrough communicating with said air space between said inner housing member and said outer housing member, with an air cathode member secured in each of said apertures, said air cathode members each constructed to be air-permeable; and said anode means comprises a plurality of anode means, each removably secured to the underside of said cover member, and each extending into a different one of said compartments in said inner housing member.

13. The combination according to claim 12 wherein said cover means further includes air vents therein communicating with the open top of said inner housing member when said cover means covers the tops of said lower outer housing member and said inner housing member.

14. The combination according to claim 13 wherein said anode means comprises an elongated metallic rod selected from the class of aluminum, magnesium and magnesium-aluminum alloys.

15. The combination according to claim 14 wherein said inner housing member is adapted to be filled with a salt water solution.

16. The combination according to claim 1 wherein said air cathode member comprises a laminate of carbon, expanded metal mesh, and an air-permeable film, with the film on the side of said cathode member, facing said air space.

17. The combination according to claim 16 further including a frame member for securing said air cathode member in said aperture in said inner housing member.

18. The combination according to claim 17 wherein said anode means comprises an elongated metallic rod secured by a threaded fastener to the underside of said cover means.

19. The combination according to claim 1 wherein said inner housing member is permanently secured to said lower outer housing member.

20. The combination according to claim 1 wherein said inner housing member is removably secured to said lower outer housing member.

21. The combination according to claim 1 wherein said anode means comprises an elongated metallic rod secured by a threaded fastener to the underside of said cover means.

22. The combination according to claim 21 wherein said anode means comprises an elongated metallic rod selected from the class of aluminum, magnesium and magnesium-aluminum alloys.

23. The combination according to claim 22 wherein said inner housing member is adapted to be filled with a salt water solution.

24. The combination according to claim 1 wherein said lower outer housing member has four vertically arranged rectangular sides, interconnected at the edges to form an open topped box; and said inner housing member includes at least four vertically oriented, rectangular sides forming an open topped box, and located within said lower outer housing member, with each side thereof spaced from the sides of said lower outer housing member to form said air space.

25. The combination according to claim 1 further including a frame member for securing said air cathode member in said aperture in said inner housing member.

26. The combination according to claim 1 wherein said cover means further includes air vents therein communicating with the open top of said inner housing member when said cover means covers the tops of said lower outer housing member and said inner housing member.

27. The combination according to claim 26 wherein said inner housing member comprises a plurality of separate sealed compartments for holding water solution therein, each of said sealed compartments having at least one side with an aperture therethrough communicating with said air space between said inner housing member and said outer housing member, with an air cathode member secured in each of said apertures, said air cathode members each constructed to be air-permeable; and said anode means comprises a plurality of anode means, each removably secured to the underside of said cover member, and each extending into a different one of said compartments in said inner housing member.

28. A portable direct current electric generator including in combination:
 a housing member having at least first and second open topped sealed compartments, each having an aperture therein;
 first and second air cathode members secured, respectively, in the apertures in said first and second compartments;
 cover means having air vents therethrough for covering the tops of said first and second compartments;
 anode means removably secured to the underside of said cover means for extending into the interiors of said first and second compartments; and
 means for interconnecting an electrical load between said anode means and said air cathode members.

29. The combination according to claim 28 wherein said first and second compartments are spaced from one another with the apertures therein facing one another.

30. The combination according to claim 29 wherein said anode means comprises an elongated metallic rod secured by a threaded fastener to the underside of said cover means.

31. The combination according to claim 30 wherein said air cathode member comprises a laminate of carbon, expanded metal mesh, and an air-permeable film, with the film on the side of said cathode member, facing said air space.

32. The combination according to claim 31 wherein said inner housing member is adapted to be filled with a salt water solution.

33. The combination according to claim 32 wherein said anode means comprises an elongated metallic rod selected from the class of aluminum, magnesium and magnesium-aluminum alloys.

34. The combination according to claim 33 further including a frame member for securing said air cathode member in said aperture in said inner housing member.

* * * * *